(12) United States Patent
Jain et al.

(10) Patent No.: US 9,144,002 B2
(45) Date of Patent: *Sep. 22, 2015

(54) METHOD FOR PERFORMING PROACTIVE WIRELESS COMMUNICATION HANDOFFS USING A MOBILE CLIENT'S ROUTE INFORMATION

(71) Applicant: Robert Bosch GmbH, Stuttgart (DE)

(72) Inventors: Vivek Jain, Mountain View, CA (US); Lakshmi Venkatraman, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 256 days.

This patent is subject to a terminal disclaimer.

(21) Appl. No.: 13/862,589

(22) Filed: Apr. 15, 2013

(65) Prior Publication Data

US 2013/0223329 A1     Aug. 29, 2013

Related U.S. Application Data

(63) Continuation of application No. 12/418,825, filed on Apr. 6, 2009, now Pat. No. 8,422,460.

(51) Int. Cl.
*H04J 3/26* (2006.01)
*H04W 36/32* (2009.01)
*H04W 36/00* (2009.01)

(52) U.S. Cl.
CPC .......... *H04W 36/32* (2013.01); *H04W 36/0055* (2013.01)

(58) Field of Classification Search
CPC .......................... H04W 36/0055; H04W 36/32
See application file for complete search history.

(56) References Cited

U.S. PATENT DOCUMENTS

| 2004/0121774 | A1* | 6/2004 | Rajkotia et al. | 455/441 |
| 2005/0083888 | A1* | 4/2005 | Smee et al. | 370/332 |
| 2005/0090260 | A1* | 4/2005 | Semper | 455/442 |
| 2008/0107082 | A1* | 5/2008 | Igarashi et al. | 370/331 |
| 2009/0156210 | A1* | 6/2009 | Ponce De Leon et al. | 455/436 |
| 2009/0323633 | A1* | 12/2009 | Burgess et al. | 370/331 |

* cited by examiner

*Primary Examiner* — Ajay Cattungal
(74) *Attorney, Agent, or Firm* — Maginot Moore & Beck LLP

(57) ABSTRACT

A method of handing off radio resources from a first base station to a second base station includes transmitting route information and speed information associated with a client device from the client device to the first base station or to an application server. A time is selected at which the radio resources are to be handed off from the first base station to the second base station. The selection is performed by the first base station or the application server. The selection is performed dependent upon the route information and speed information.

27 Claims, 10 Drawing Sheets

METHOD FOR PERFORMING PROACTIVE WIRELESS COMMUNICATION HANDOFFS USING A MOBILE CLIENT'S ROUTE INFORMATION

COPYRIGHT NOTICE

Portions of this document are subject to copyright protection. The copyright owner does not object to facsimile reproduction of the patent document as it is made available by the U.S. Patent and Trademark Office. However, the copyright owner reserves all copyrights in the software described herein and shown in the drawings. The following notice applies to the software described and illustrated herein: Copyright © 2009, Robert Bosch GmbH, All Rights Reserved.

BACKGROUND

1. Field of the Invention

The present invention relates to a method for wireless communication, and, more particularly, to a method for wireless communication with increased performance and reliability within a vehicle.

2. Description of the Related Art.

It is known for wireless communication to be established between various systems within a vehicle, such as an automobile, and external applications such as an internet search engine, for example. Attaining reliable wireless communication with a vehicle is problematic, however, because wireless communication is deeply affected by the quality of the wireless signals as received by the vehicle as it travels toward and away from various base stations. The quality of the signals received by the vehicle is highly dependent upon the distance between the vehicle and the nearest transmitting base station as well as on the level of traffic on the communication channel between the vehicle and the base station.

The handoff process is always one of the major challenges in providing pervasive and ubiquitous mobile wireless services. Handoff is defined as the transfer of radio resources from a previously used base station to a new base station. Normally handoff is carried out when the reception from the current base station is below a certain threshold as illustrated in FIG. 1. A client vehicle may travel in direction 11. The level of signal power from base stations A and B as received at the client vehicle is shown as $P_{rxA}$ and $P_{rxB}$, respectively. Base station A may have an area of coverage indicated by 16A, and base station B may have an area of coverage indicated by 16B. When the level of signal power from base station A falls below a threshold power level $P_{th}$ (i.e., $P_{rxA}<P_{th}$), as at 12, then handoff is initiated. The actual handoff may occur at 14.

Depending on the technology used, handoff may be of either the hard type or the soft type. A hard handoff (also known as break before make) involves releasing current resources before acquiring the new ones. This hard type of handoff is common with Time Division Multiple Access (TDMA)/Frequency Division Multiple Access (FDMA) based technologies, though new generation cellular systems have mitigated this issue to some extent. A soft handoff (also known as make before break), on the other hand, involves establishing communication with a new base station while still maintaining the old base station. This soft type of handoff is very common for Code Division Multiple Access (CDMA) based systems.

Current solutions for transferring resources from an old base station to the new one are not sufficient to provide the required Quality of Service (QoS) for continuous streaming applications. The present invention provides several methods of using location based information to assist the handoff process and thereby enhance the overall network performance for all applications.

What is neither disclosed nor suggested in the art is a method for mobile wireless communication that overcomes the above-mentioned problems and disadvantages. More specifically, what is neither disclosed nor suggested in the art is a method for mobile wireless communication in which handoffs can be planned based on information pertaining to the expected route to be taken by the vehicle to its destination. That is, the prior art does not disclose or suggest using vehicle route information proactively rather than reactively to assist handoffs in wireless networks.

SUMMARY OF THE INVENTION

The present invention provides a method for advance planning of handoffs using route information of the mobile clients. The present invention provides various handoff procedures utilizing the route information of the mobile clients. Such clients include cell phones, notebooks/laptops, cars and other handhelds. It is increasingly common for these devices to have a global positioning system (GPS) receiver and route maps. Hence, using this route information of the mobile client to assist in wireless networking, especially during handoff, is becoming very feasible and attractive. Using route information and the client's average speed, the handoff can be initiated by the base station, client or the application server itself. In contrast, in known systems, the handoff can be initiated by only the client.

As further provided by the present invention, the handoff can easily be performed among heterogeneous wireless networks. Also, a client can communicate with several networks at a given time to fill in the required bandwidth for the application. The present invention may provide several such techniques and optimizes handoffs by using medium access control (MAC) address, or some other unique identifier of the client device, along with the wireless technologies supported by the client device as a connection parameter rather than the internet protocol (IP) address of the client address.

The handoff decision may be made by the server depending on the outgoing quality of service and the route and speed information from the mobile node. The server may sit between the two BSs/APs and perform the handoff on behalf of the mobile node.

The invention comprises, in one form thereof, a method of handing off radio resources from a first base station to a second base station. Route information and speed information associated with a client device is transmitted from the client device to one of the first base station and an application server. A time is selected at which the radio resources are to be handed off from the first base station to the second base station. The selection is performed by the one of the first base station and the application server. The selection is performed dependent upon the route information and speed information.

The invention comprises, in another form thereof, a method of handing off radio resources between base stations. Route information and speed information associated with a client device is transmitted from the client device to an application server. A second of the base stations to which the radio resources are to be handed off from a first of the base stations is chosen. A time at which the radio resources are to be handed off from the first base station to the second base station is selected. The choosing and selecting are performed by the application server. The choosing and selecting are performed dependent upon the route information and speed information.

The invention comprises, in yet another form thereof, a method of wirelessly communicating between an application server and a client device. Data packets are transmitted from the application server to each of a first base station and a second base station. Each of the data packets includes a unique identification of the client device other than an IP address. Radio resources associated with the client device are handed off from the first base station to the second base station. First ones of the data packets are transmitted before the handing off step. Second ones of the data packets are transmitted after the handing off step. The first data packets are relayed from the first base station to the client device. The second data packets are relayed from the second base station to the client device.

The invention comprises, in still another form thereof, a method of handing off radio resources between base stations. A list of supported base stations is maintained on a client device. It is determined whether a quality of service at the client device exceeds a threshold level of quality. If the quality of service at the client device is below the threshold level of quality, the client device is used to choose a second of the base stations on the list to which the radio resources are to be handed off from a first of the base stations on the list.

An advantage of the present invention is that the performance of mobile wireless communications while handing off communication from one base station to another may be improved.

Another advantage is that the present invention may be implemented regardless of the underlying wireless service provider.

Yet another advantage is that the invention may be employed in any automotive internet application, and especially in those applications including multimedia.

A further advantage is that, in addition to handoffs being initiated by a mobile node, the handoffs can also be initiated by the application server and BS/AP. The handoff can be proactive based on location and speed, instead of waiting for link degradation. The list of nearby BS/APs is kept at either the BS/AP (for BS initiated handoff), the mobile node (for mobile node initiated handoff), or at the application server (for application server initiated handoff).

Still another advantage is that the present invention involves minimal handoffs and only the one that supports the services and is best suited for the node. Also, the handoff is initiated much earlier and with minimal overhead as compared to schemes that monitor link quality/quality of service continuously.

A still further advantage is that the present invention uses route information and hence a better estimate of the next good base station/access point can be made much earlier, thereby making the handoff process more efficient. Further, with the present invention some uniform load distribution algorithms can be employed at the BS/Access points as the decision is made earlier.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
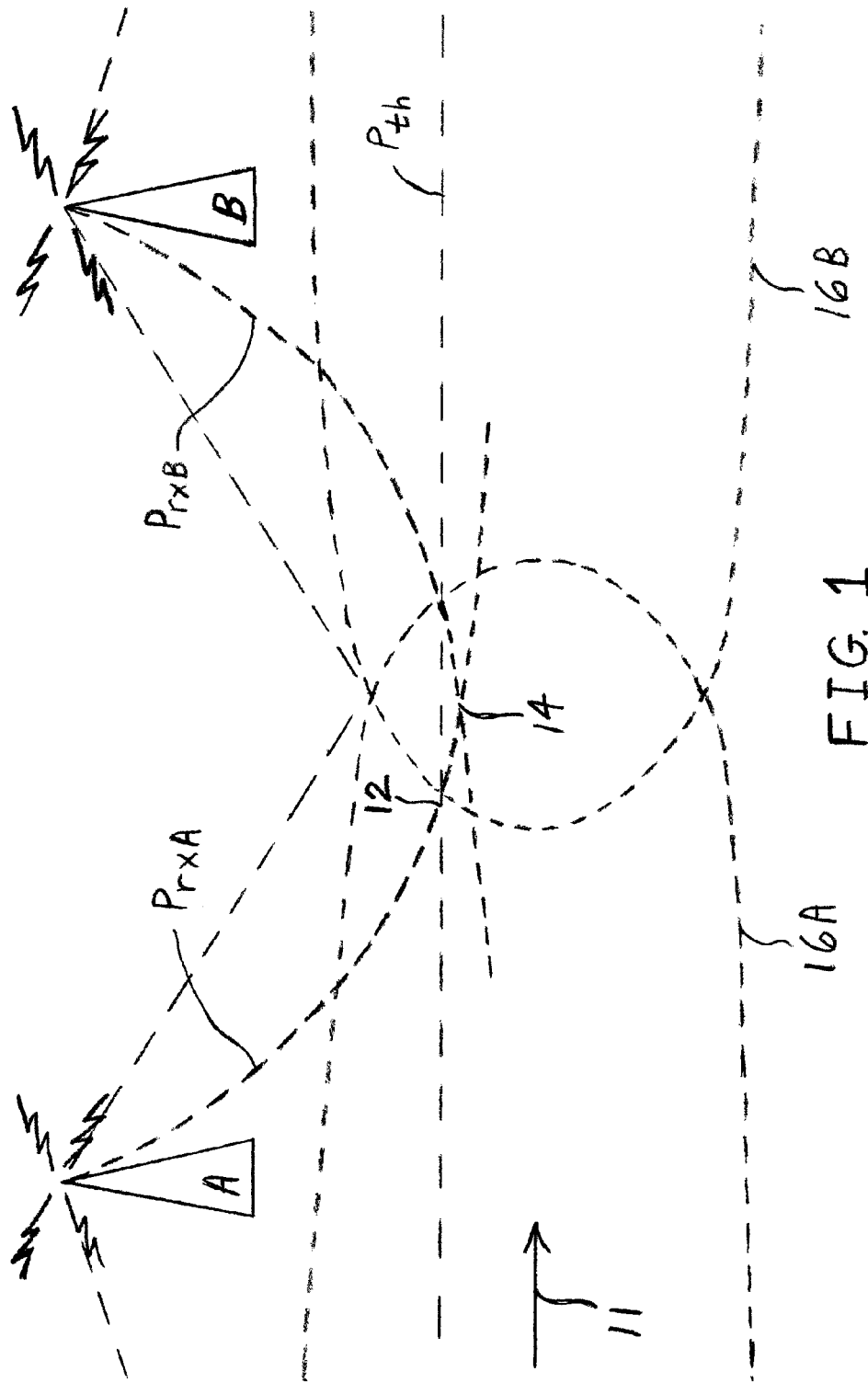
FIG. 1 is a diagram of a generic wireless communication handoff procedure along a direction of motion according to the prior art.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Any application has three main components: the client, the network and the application server. Clients include any mobile device such as a car/vehicle, laptop/notebook, cell phones and other handheld devices. The networking technologies include cellular, WiFi, Worldwide Inter-operability for Microwave Access (WiMAX) or any other Local Area Network (LAN)/Metropolitan Area Network (MAN)/Wide Area Network (WAN) technologies. The last of the three components, application servers, are very application specific.

Figure 2:
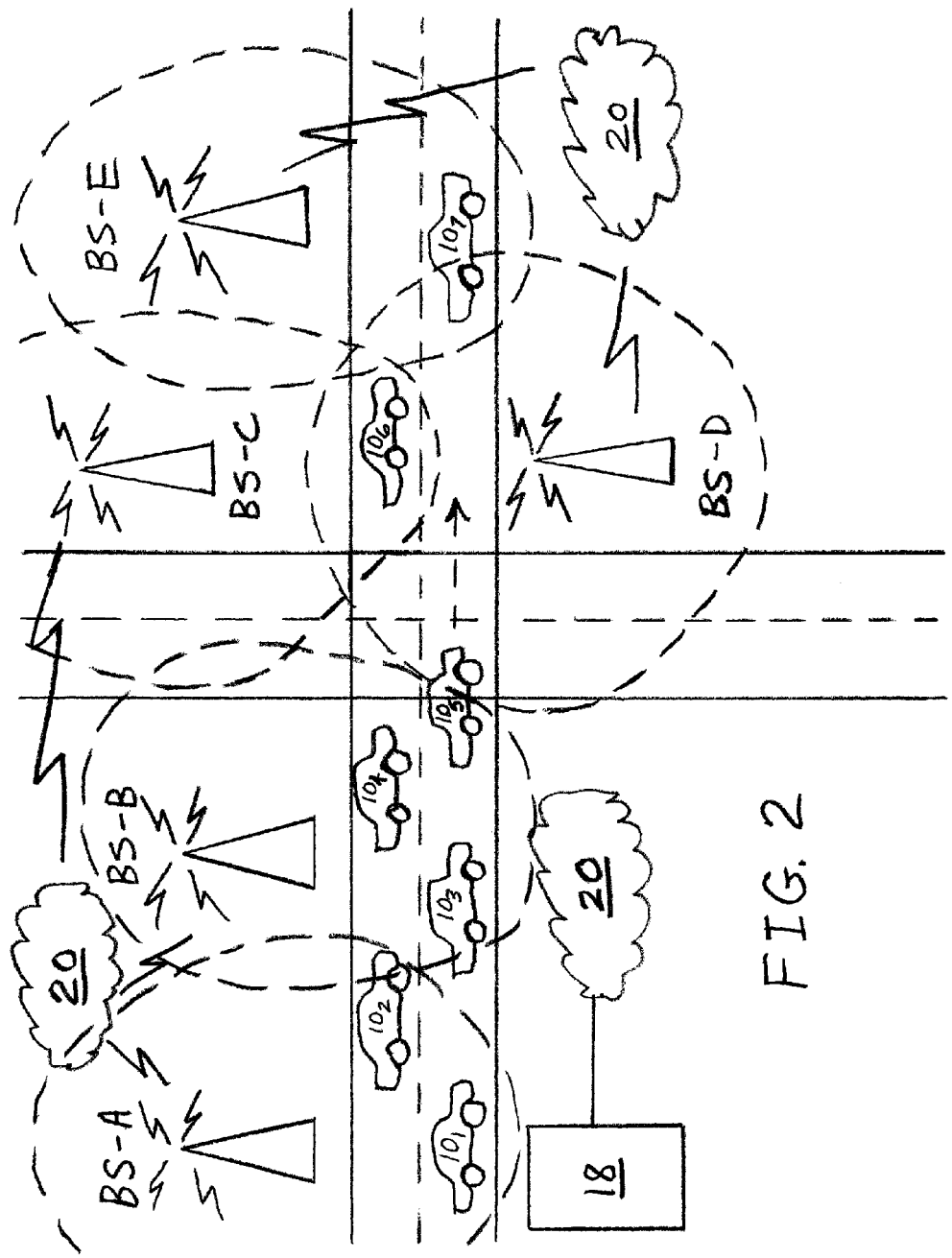
FIG. 2 is a diagram of a wireless communication system of the present invention in which handoffs due to poor coverage (signal strength) occur.

Handoffs may be performed to rectify either problems of coverage or quality of service (capacity) problems. Handoffs due to poor coverage may result from low strength in the signal received from the base station. Illustrated in FIG. 2 is one embodiment of a coverage-based handoff scenario. As the client, represented by one of vehicles 10, is expected move from the left-hand side to the right-hand side of FIG. 2 out of the coverage, a handoff may need to be initiated. For example, clients $10_4$ and $10_5$ may connect to base stations BS-C and BS-D, respectively, according to their routes. An application service provider 18 may communicate with clients 10 via the internet 20 and the base stations. As used herein, the terms base station (BS) and access point (AP) may be synonymous.

Figure 3:
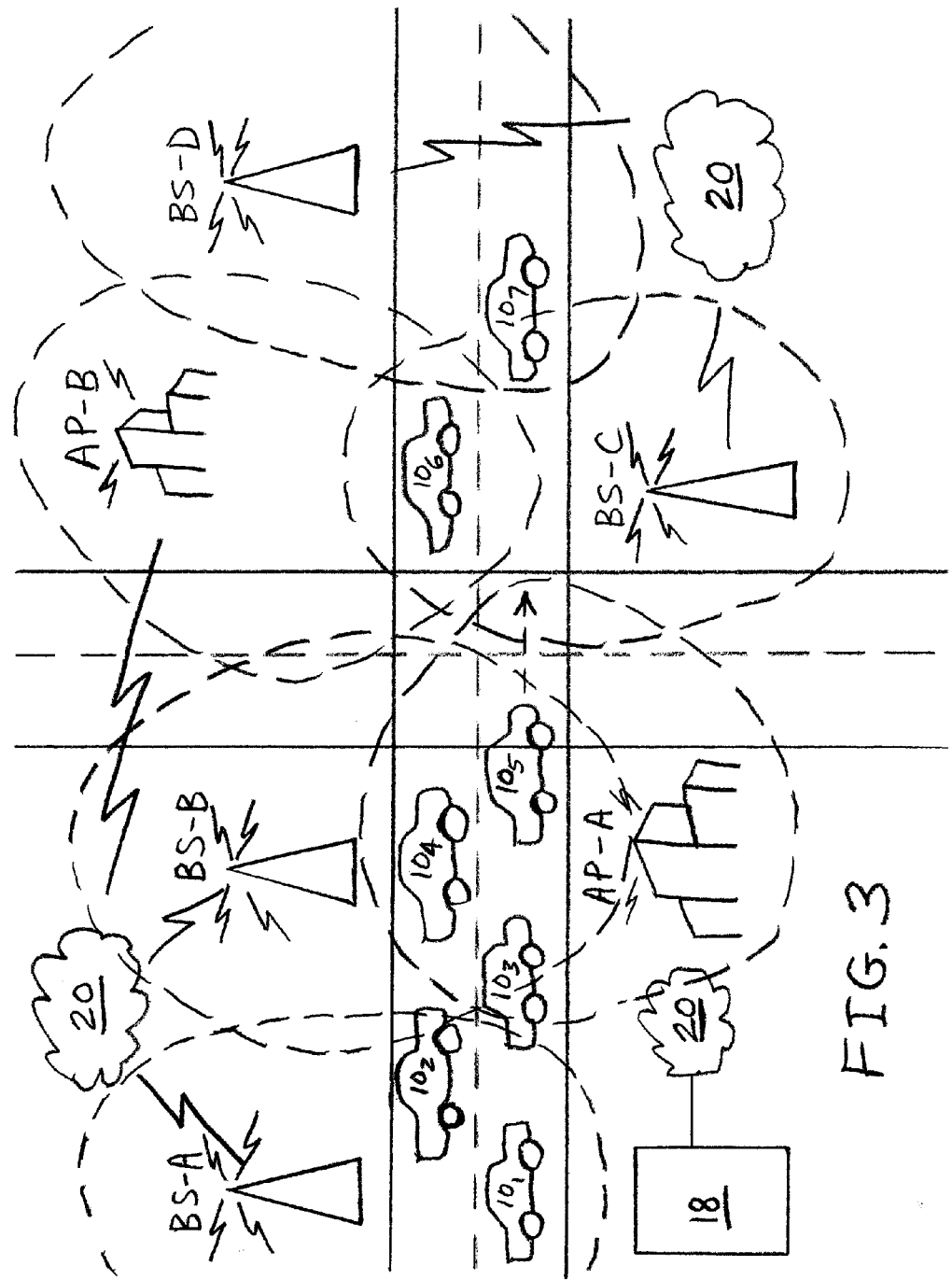
FIG. 3 is a diagram of a wireless communication system of the present invention in which handoffs due to poor quality of service (network capacity) occur.

Handoffs due to poor quality of signal (network capacity) are illustrated in FIG. 3. Here as the quality of service goes below the desired threshold, the client may connect to alternate wireless networks to get the desired quality. For example, if the connection of client $10_5$ to BS-B and BS-C is not good then client $10_5$ can connect to AP-A for the intermediate time. On the other hand, client $10_4$ will switch from BS-B to AP-B as it moves out from the coverage of BS-B.

Figure 4:
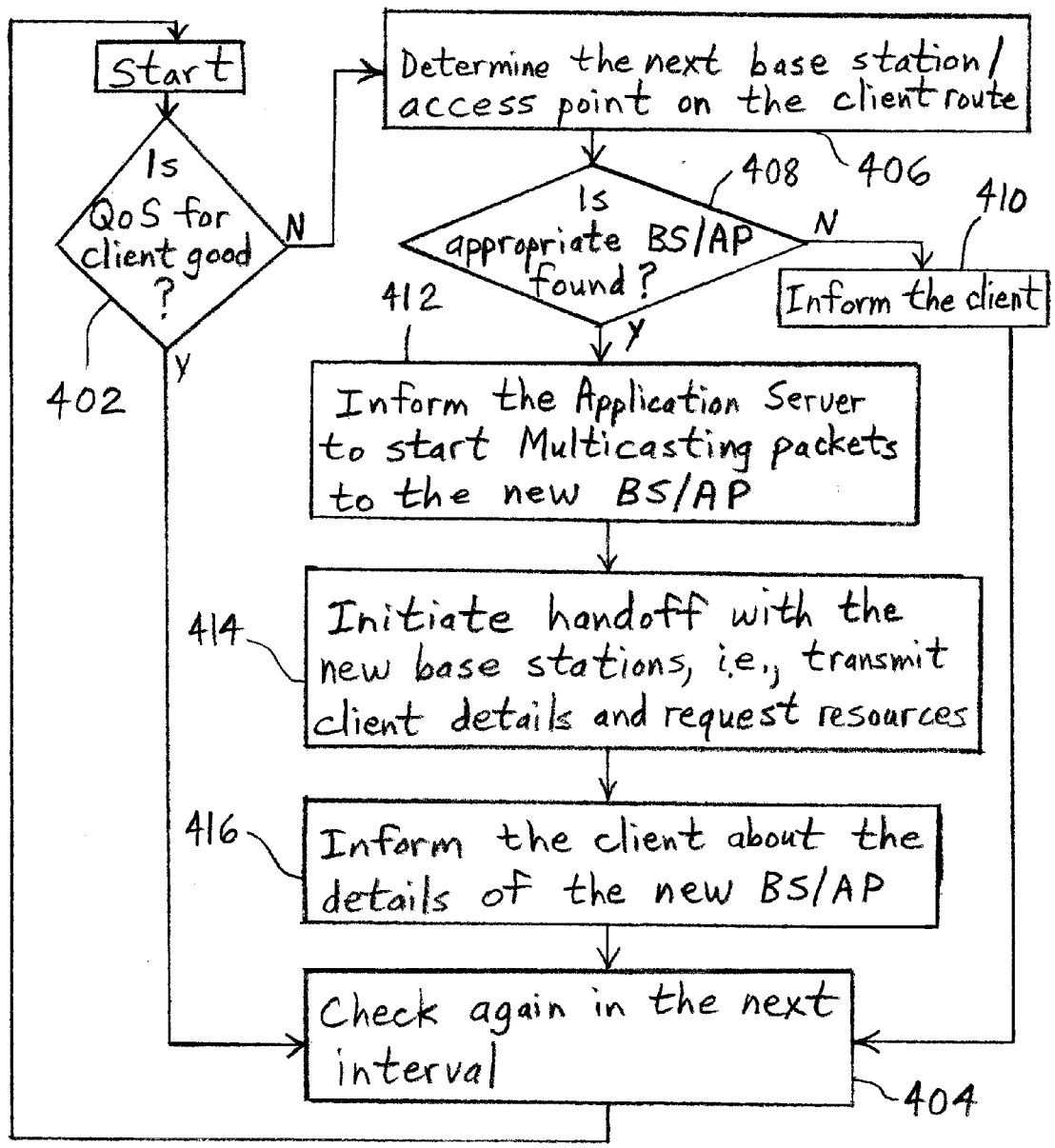
FIG. 4 is a flow chart of one embodiment of a base station initiated handoff algorithm of the present invention.

The present invention provides efficient handoff methods using route information. In one embodiment of a method 400 (FIG. 4) for a base station initiated handoff, the base station initiates the handoff, and may constantly monitor the outgoing quality of service for the application running on the client side. If the quality of service is good, as determined in step 402, then the quality of service is checked again in the next interval (step 404). In the event that it is determined in step 402 that the quality of service is below the threshold, the base station may scan for the other base stations that are in the vicinity or select one that is already in its list/cache (as BPs/APs are generally static) and that may provide a better quality of service by virtue of being closer to the client device, for example (step 406). If the quality of service is below the threshold, the base station may also respond by requesting route information and speed information from the client device.

Next, if it is determined in step 408 that an appropriate BS/AP is not found, then the client is informed (step 410) and operation proceeds to step 404 where the quality of service is checked again in the next interval. However, if it is determined in step 408 that an appropriate BS/AP is found, then the application server is informed in step 412 to start multicasting packets to the new BS/AP. In one embodiment, the new BS/AP instructs the application server to begin transmitting application data packets to only the new BS/AP.

The quality of service can degrade due to an increasing number of users in the network or due to the mobile station reaching near the cell coverage boundary of the base station. In both of these cases the base station may request the route information and current average speed from the vehicle. The base station may then select the next best base station as described in steps 408, 412 above and initiate the handoff procedure (step 414). The handoff procedure of step 414 includes initiating the handoff with the new base stations, i.e., transmitting client details and requesting resources. Once the process is complete, the new base stations inform the application server to start uni-casting the application packets to them, i.e., to start transmitting the application packets to only the new base station. However, for practical scenarios this scheme is better suited for handoffs between base stations using similar technologies such as between cellular base stations or between WiFi/WiMAX base stations.

In step 416, the client is informed about the details of the new BS/AP. Operation then proceeds to step 404 wherein the quality of service for the client is again checked in the next time interval.

The advantages of such a base station initiated handoff include minimizing the association time during handoff. The association time during handoff may be minimized due to the client receiving in advance of the handoff the crucial radio resource information of the new base station from the old base station. Such crucial radio resource information of the new base station may include frequency slot, code slot, power level, beacons, timing parameters, base station identifications, etc.

Another advantage of such a base station initiated handoff is that it may minimize resource allocation time as the new base station anticipates a new client in the network. Resource allocation time may be reduced as the new base station reserves resources in advance of the handoff.

Yet another advantage of such a base station initiated handoff is that it may minimize authentication time during handoff. The reduction in authentication time during handoff may result from the old base station executing the authentication procedure on behalf of the client while requesting resources from the new base station.

Yet another advantage of such a base station initiated handoff is that the client is informed in advance of the connection break. Thus, the client is able to initiate other procedures such as connecting to an alterative wireless network such as local WiFi, etc.

As stated above, in known systems the handoff is requested by the vehicle when the received signal strength goes below the desired threshold. However, the application quality of service can go down if any of the intermediate routes in between the client and the server is congested. In the known systems, the client uses only one connection/technology to provide the application service.

In the present invention, the vehicle may be able to request handoff and may be able to initiate simultaneous connections with several other available wireless networks to fill in the desired bandwidth. Generally, a service is provided by several content distribution networks and thus the vehicle may use parallel connections through mutually exclusive networks to receive multiple streams of data simultaneously and combine them locally to achieve the desired quality of service.

Figure 5:
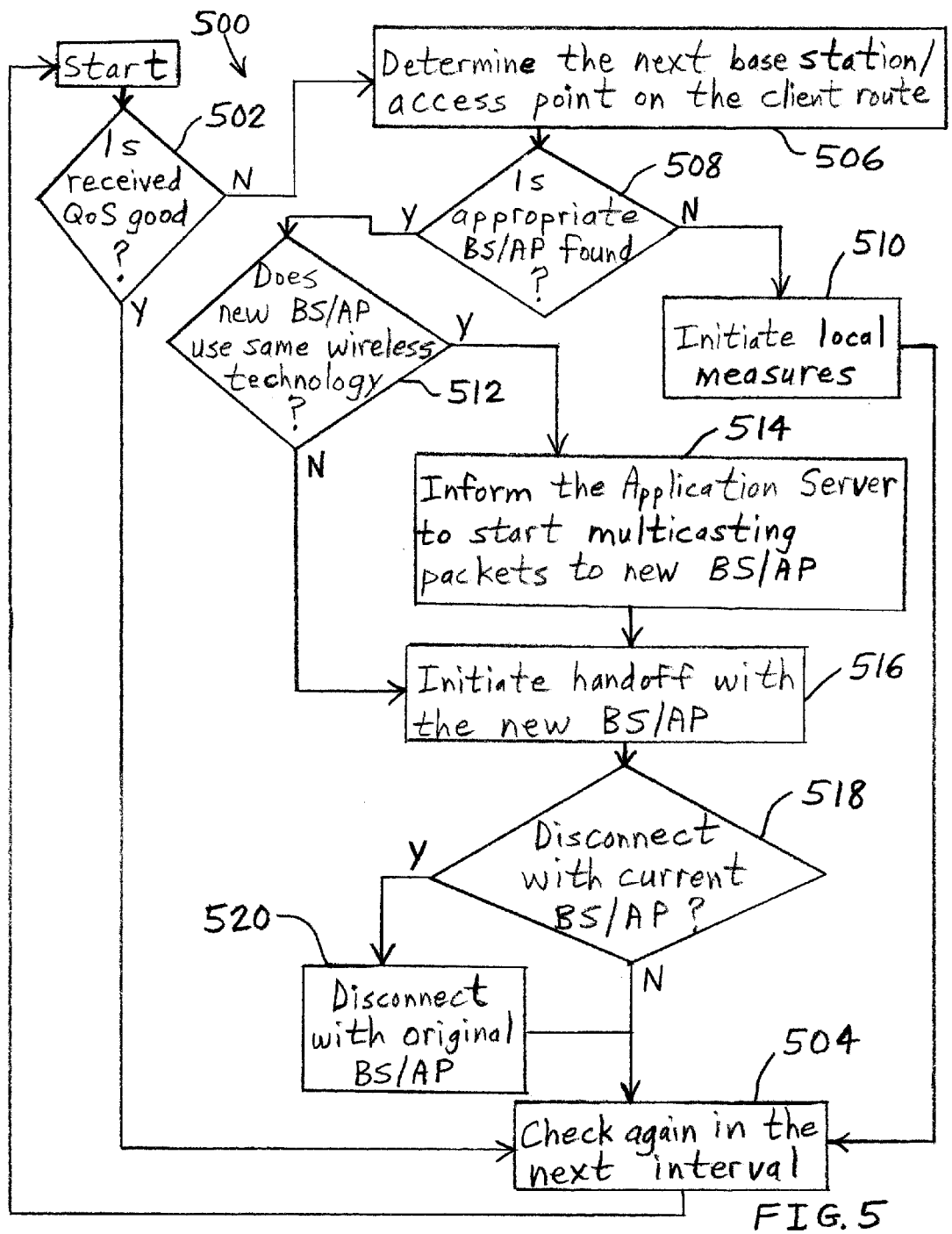
FIG. 5 is a flow chart of one embodiment of a client initiated handoff algorithm of the present invention.

However, for this scheme to work effectively the client needs to have an updated (real-time) list of base station/access points on its route, the wireless technologies they support, and their current capacity usage. Using this information, the client may select the best access points on its way. One embodiment of a client initiated handoff algorithm 500 of the present invention is illustrated in FIG. 5.

If the quality of service is good, as determined in step 502, then the quality of service is checked again in the next time interval (step 504). In the event that it is determined in step 502 that the quality of service is below the threshold, the mobile node picks up an appropriate BS/AP from a pre-existing list or queries/scans for an appropriate BS/AP on its current route (step 506).

If it is determined in step 508 that an appropriate BS/AP is not found, then local measures are initiated (step 510) and operation proceeds to step 504 where the quality of service is checked again in the next time interval. If it is determined in step 508 that an appropriate BS/AP is found, then it is determined in step 512 whether the new BS/AP uses the same wireless technology as the old (i.e., immediately previous) BS/AP.

If it is determined in step 512 that the new BS/AP uses the same wireless technology as the old BS/AP, then the application server is informed in step 514 to start multicasting packets to the new BS/AP. Operation then proceeds to step 516 wherein the handoff with the new BS/AP is initiated.

If it is determined in step 512 that the new BS/AP does not use the same wireless technology as the old BS/AP, then operation proceeds directly to step 516 wherein the handoff with the new BS/AP is initiated. After step 516, it is determined in step 518 whether the quality of service with the new BS/AP is good enough that the current BS/AP can be disconnected. If the quality of service with the new BS/AP is good enough, then the current BS/AP is indeed disconnected in step 520. If, however, it is determined in step 518 that the quality of service with the new BS/AP is not good enough that the current BS/AP can be disconnected, then operation proceeds to step 504 wherein the quality of service for the client is again checked in the next time interval.

The local measures associated with a client initiated handoff may vary depending on the current application and its operation as provided by the vendor. The advantages of such a client initiated handoff may include flexibility on the client side to choose the best available wireless networking technology to use.

Another advantage of such a client initiated handoff may be that it enables connection to multiple providers at the same time. For example in FIG. 3, client $10_5$ can simultaneously connect to BS-B and AP-A to receive multiple parts of the same file. Thus, client $10_5$ can receive at least some portions of a single file in duplicate from BS-B and AP-A, thereby increasing the likelihood that client $10_5$ correctly receives each portion of the file at least once.

Another advantage of a client initiated handoff may be that the scheme can be further enhanced wherein the client also sends its list of base station/access points in advance so that the resources for the incoming client can be booked in advance (e.g., using its average speed and distance information). Thus, each base station/access point may advertise its current capacity as well as its expected capacity when the client is expected to be in the region of the base station/access point.

In the present invention, the application server may also initiate handoff. In such a case, the application service provider may maintain a list of access points and base stations on the given route and the wireless technologies that the access points and base stations support. In this scenario, a vehicle requesting a particular application may also send along with the request the vehicle's route information and the wireless technologies available within the vehicle. Further, the average speed of the vehicle may also be transmitted either periodically or within the acknowledgement packets. Based on this information, the application server may route the data packet to the appropriate access point, taking into account the speed of the vehicle. Thus, as the vehicle proceeds on a given route, the vehicle may initiate a connection with the preferred list of access points (from the service provider) and the desired data may be immediately available to the vehicle.

Figure 6:
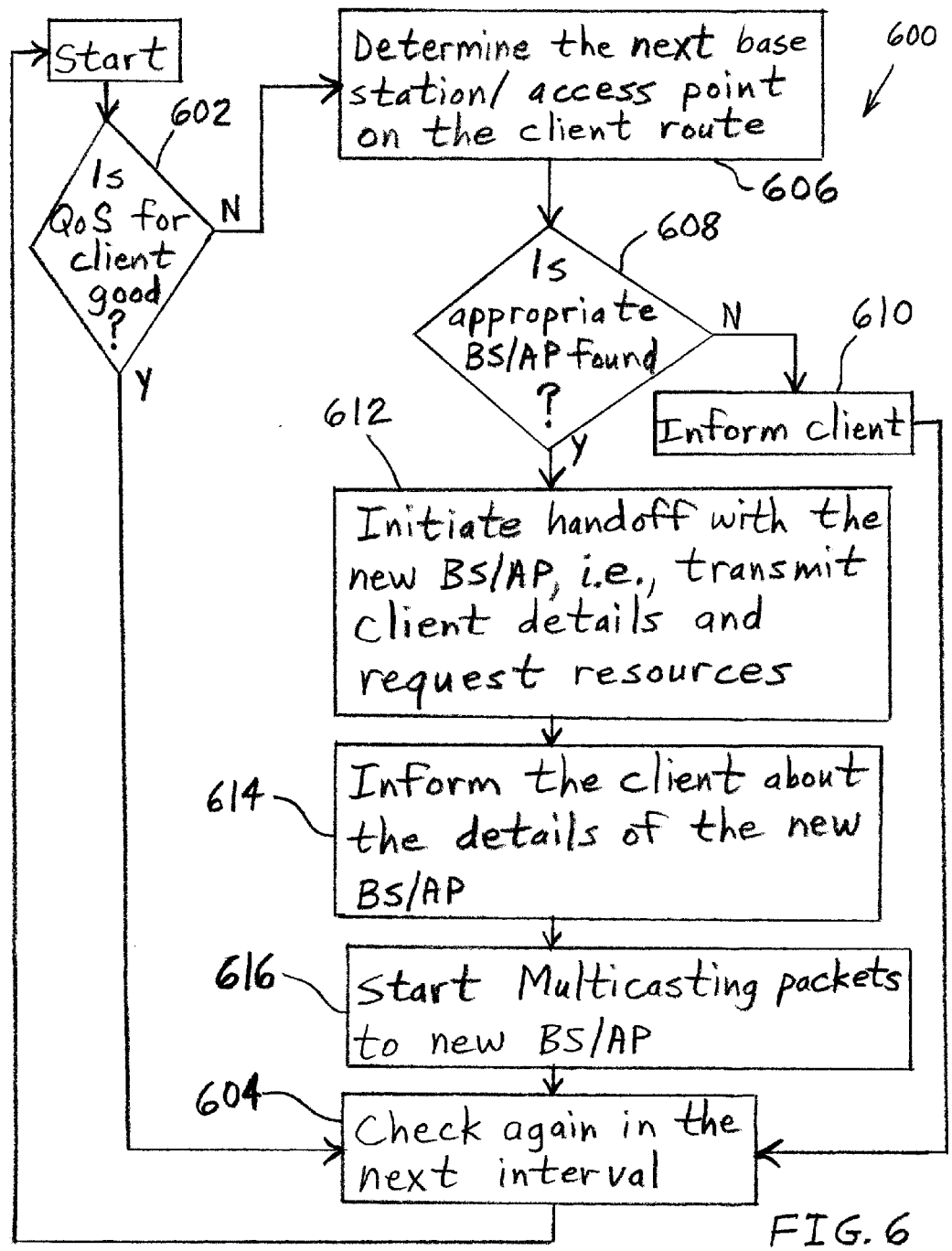
FIG. 6 is a flow chart of one embodiment of an application server initiated handoff algorithm of the present invention.

One embodiment of an algorithm 600 for an application server initiated handoff is illustrated in FIG. 6. The outgoing quality of service for the application running on the client side may be constantly monitored. If the quality of service is good, as determined in step 602, then the quality of service is checked again in the next interval (step 604).

In the event that it is determined in step 602 that the quality of service is below the threshold, the next base station/access point on the client route may be determined (step 606).

The client device may transmit support information to the application server identifying wireless technologies that are supported by the client device. The application server may use the support information in selecting a next station/access point that is compatible with the wireless technologies. The application server may maintain a list of the available base stations, locations of the base stations, and the capabilities of the individual base stations.

Next, if it is determined in step 608 that an appropriate BS/AP is not found, then the client is informed (step 610) and operation proceeds to step 604 where the quality of service is checked again in the next interval. However, if it is determined in step 608 that an appropriate BS/AP is found, then the handoff with the new BS/AP is initiated (step 612). More particularly, client details are transmitted to the new BS/AP and resources are requested from the new BS/AP.

Before the radio resources are handed off from the first base station to the second base station, the second base station may reserve network resources for the client device. Also before the radio resources are handed off from the first base station to the second base station, the application server may execute an authentication procedure for the second base station on behalf of the client device.

Next, in step 614, the client is informed about the details of the new BS/AP. Such details may include the types of technologies that are supported by the new BS/AP, as well as any communications protocols and/or identifications that are unique to the new BS/AP.

In the next step 616, multicasting of packets to the new BS/AP begins. That is, the client device and the application server may begin communicating through the new BS/AP as well as continue communicating through the old BS/AP.

Operation then proceeds to step 604 wherein the quality of service for the client is again checked in the next time interval. Method 600 then begins its next iteration at the Start and continues indefinitely as described.

The advantages of such an application server initiated handoff may include minimizing the association time during handoff as the client has already received the crucial radio resource information of the new BS/AP such as frequency/code/clot, power level, beacons, timing parameters, base station identifications, etc. from the application server.

Another advantage of an application server initiated handoff is that it may minimize resource allocation time as the new base station reserves resources in advance of the handoff. The new base station may reserve resources in anticipation of a new client in the network.

Yet another advantage of an application server initiated handoff is that it may minimize authentication time during handoff. The reduction in authentication time may be due to the server executing the authentication procedure on behalf of the client while asking for resources from the new base station.

Still another advantage of an application server initiated handoff is that the handoff may be supported through heterogeneous networks such as between cellular, WiFi, WiMAX, etc. The only limitation on the support of the handoff may be the network technologies supported by the client.

The present invention provides methods that may be undertaken in advance of the handoff, such as when the handoff is through heterogeneous networks. In the case of a handoff through heterogeneous networks, not only the application data switches to the new access point, but the radio resources also move through heterogeneous networks. In most cases, this type of handoff may be initiated by the client with support of application service provider handoff procedures. Such handoffs may be initiated by the client using layer 2/3 handoff procedures. Layer 2 handoff procedures may include the three phases of discovery, reauthentication, and reassociation. However, layer 2/3 handoff procedures may lead to longer delays at the application level, as these handoffs may be reactive rather than proactive. Also, base station handoff procedures may not be efficient to support handoff through heterogeneous networks. Thus, for more practical reasons, these handoffs may be initiated by the client or by the application server. For the routes which are taken by the clients more frequently, the client can also maintain a list of the most preferred BS/APs on the route. Then, using learning algorithms, the client can learn over the time which BS/AP to connect to and when.

The present invention may include using a MAC address and wireless technology information to route application data during handoff procedure (i.e., when the application server is multicasting packets to both old and new BSs/APs). A handoff procedure may involve using IP addresses to transfer application data. The use of an IP address may work well to identify the base stations/access points which are fairly static. However, this association of the client to the new base station and message transfer using IP addresses may lead to extra delays. In order to circumvent this problem, the client may be identified by the tuple {MAC address, Wireless Technology/Standard}. This translation may be up to the base station. Thus, the application server can multicast to the two base stations simultaneously, with the client tuple information embedded in the packet as illustrated in FIG. 7.

Figure 7:
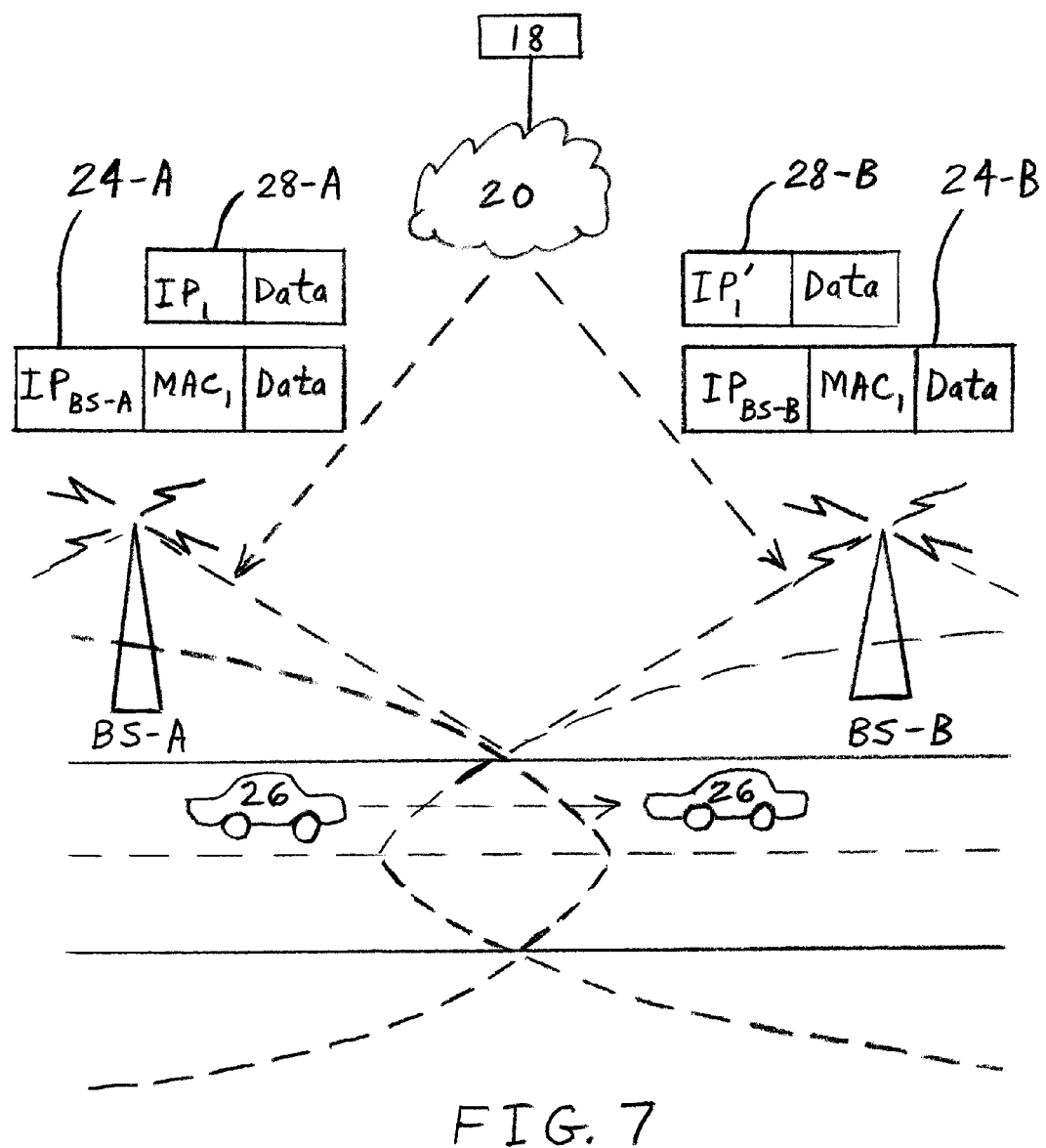
FIG. 7 is a diagram illustrating one embodiment of a method of the present invention involving client MAC addressing for handoffs.

As shown In FIG. 7, known packet formats of the prior art may include the IP address of the client immediately followed by data. According to a packet format of the present invention, however, an IP address of the base station may be immediately followed by the unique identification (e.g., a MAC address) of the client, which is followed by data. Thus, whichever base station currently has the client in its network may further transfer the packet to the client and may also inform the application server that the desired client is within the base station's network. The application server may thereby be directed to send all future data to the new base station. This process may greatly minimize the association and authentication time as both of these procedures can be handled efficiently at the network and/or application server level. This unique identification information is added only during handoff and it is assumed that during service establishment/handoff the client passes on this information to the server.

The present invention may be used in mobile wireless internet applications. One example of a product application of the present invention is a connection box in an automobile that can be a stand alone interface to a cell phone to provide better quality of service for in-car internet applications.

The present invention includes many different novel features, including handoff methods for providing continuous wireless services in a mobile client, wherein the handoff proactively rather than reactively utilizes the route and average speed information of a vehicle carrying the mobile client. Thus, faster and smoother handoffs are enabled without any degrading effect on application performance. It is not known in the prior art for a handoff to be assisted by, or to make use of, a mobile client's route information and speed. Advantageously, the vehicle speed may provide a greater level of accuracy as compared to location information received from a GPS device.

Another novel feature provided by the present invention is advanced planning of handoffs based on knowledge of routes that can be acquired using map based navigation services. This feature could also be integrated in cell phones to assist in their registration/searching process.

Yet another novel feature is that handoffs can be initiated by base stations, clients, or service providers by maintaining a list of supported base stations and access points as well as their locations and supported technologies. Thus, any one of the base stations, clients, and service providers may identify a next base station/access point that will provide the best level of quality of service along the vehicle's planned route.

Still another novel feature of the present invention is that it can also be used for heterogeneous networks (i.e., cellular, WiFi, WiMAX, etc.) to choose the right technology at the right location and time. Clients may have simultaneous connection to several networks within the scope of the invention. Thus, handoffs may be performed through multiple network providers/types, as well as across different wireless technologies.

A further novel feature is that the present invention provides tuple information, which may be in the form of {Unique Identification, wireless technology/standard/device}, about clients for faster handoff instead of using an IP address. The unique identification may include a MAC address, a cell phone number, etc.

Figure 8:
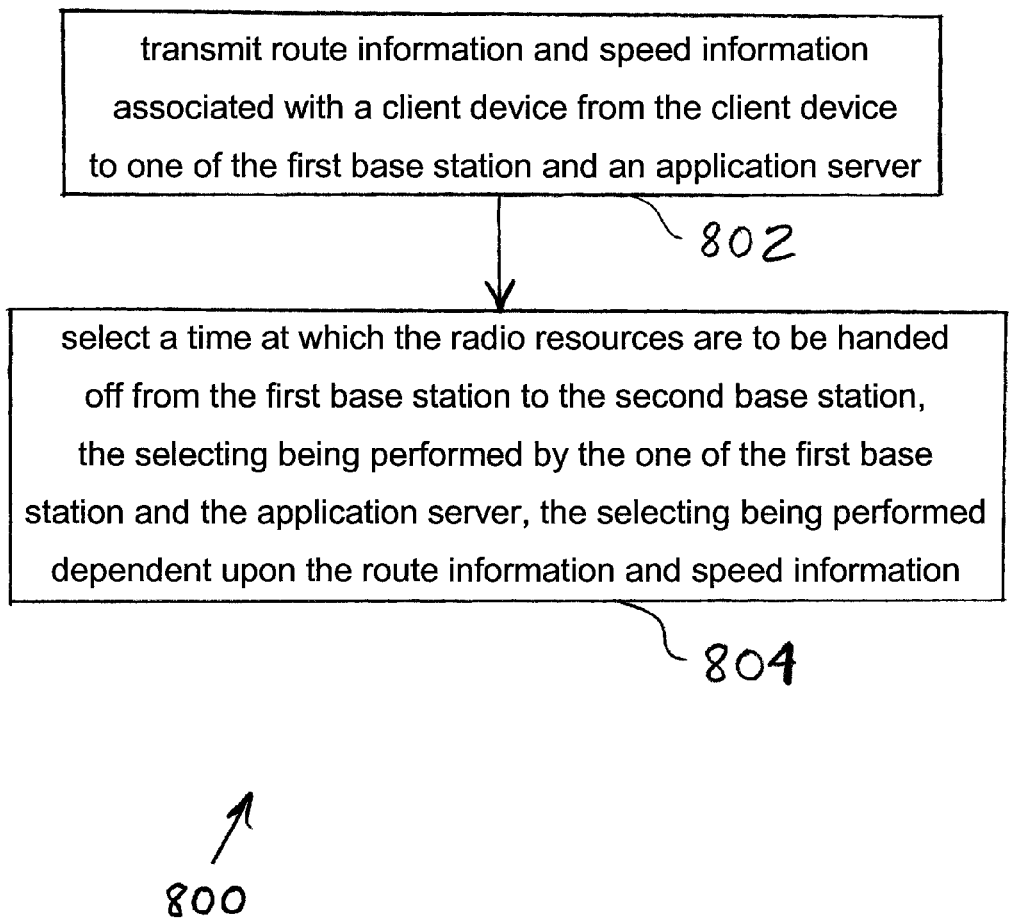
FIG. 8 is a flow chart illustrating one embodiment of a method of the present invention for handing off radio resources from a first base station to a second base station.

One embodiment of a method 800 of the present invention for handing off radio resources from a first base station to a second base station is illustrated in FIG. 8. In a first step 802, route information and speed information associated with a client device is transmitted from a client device to a first base station or to an application server. That is, a client device such as a motor vehicle may have installed therein or may carry a cell phone, notebook/laptop, or personal handheld device. The vehicle may be equipped with a GPS system and navigation system such that the expected route of the client device may be planned and recorded. The vehicle may also be equipped with a standard speedometer such that instantaneous speed and average speed information associated with the vehicle may be provided thereby. Further, the route information and the speed information associated with the vehicle may be wirelessly transmitted from the vehicle to either a transmitting/receiving base station or to an application server.

In a second step 804, a time at which the radio resources are to be handed off from the first base station to the second base station is selected, the selecting being performed by the one of the first base station and the application server, the selecting being performed dependent upon the route information and speed information. That is, the first base station or the application server may receive and analyze the vehicle's route information and speed information and determine therefrom a point in time at which the vehicle will likely have a better quality of service with the second base station than with the first base station. That point in time may be selected by the first base station or the application server as the time at which the radio resources are to be handed off from the first base station to the second base station.

Figure 9:
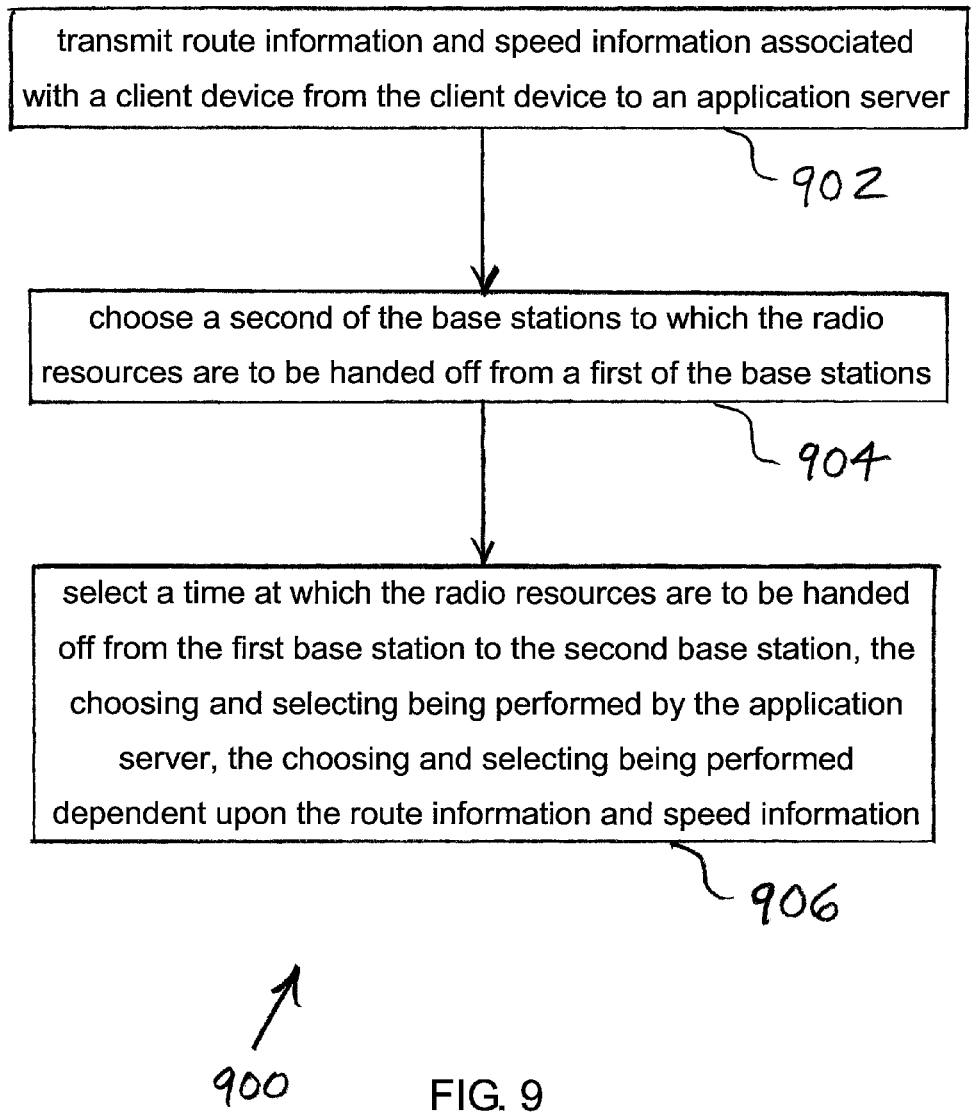
FIG. 9 is a flow chart illustrating one embodiment of a method of the present invention for handing off radio resources between base stations.

Another embodiment of a method 900 of the present invention for handing off radio resources between base stations is illustrated in FIG. 9. In a first step 902, route information and speed information associated with a client device is transmitted from the client device to an application server. For example, a client device such as a motor vehicle may have installed therein or may carry a cell phone, notebook/laptop, or personal handheld device. The vehicle may be equipped with a GPS system and navigation system such that the expected route of the client device may be planned and recorded. The vehicle may also be equipped with a standard speedometer such that instantaneous speed and average speed information associated with the vehicle may be provided thereby. Further, the route information and the speed information associated with the vehicle may be wirelessly transmitted from the vehicle to an application server.

In a second step 904, a second of the base stations is chosen to which the radio resources are to be handed off from a first of the base stations. For example, the application server may receive and analyze the vehicle's route information and speed information and determine therefrom a next base station along the route with which the vehicle will likely have a better quality of service than with the first base station. That next (i.e., second) base station may provide a better quality of service by virtue of being geographically closer to the vehicle during an upcoming segment of the vehicle's planned route.

In a third step 906, a time at which the radio resources are to be handed off from the first base station to the second base station is selected, the choosing and selecting being performed by the application server, the choosing and selecting being performed dependent upon the route information and speed information. More particularly, the application server may receive and analyze the vehicle's route information and speed information and determine therefrom a point in time at which the vehicle will likely have a better quality of service with the second base station than with the first base station. That point in time may be selected by the application server as the time at which the radio resources are to be handed off from the first base station to the second base station.

Figure 10:
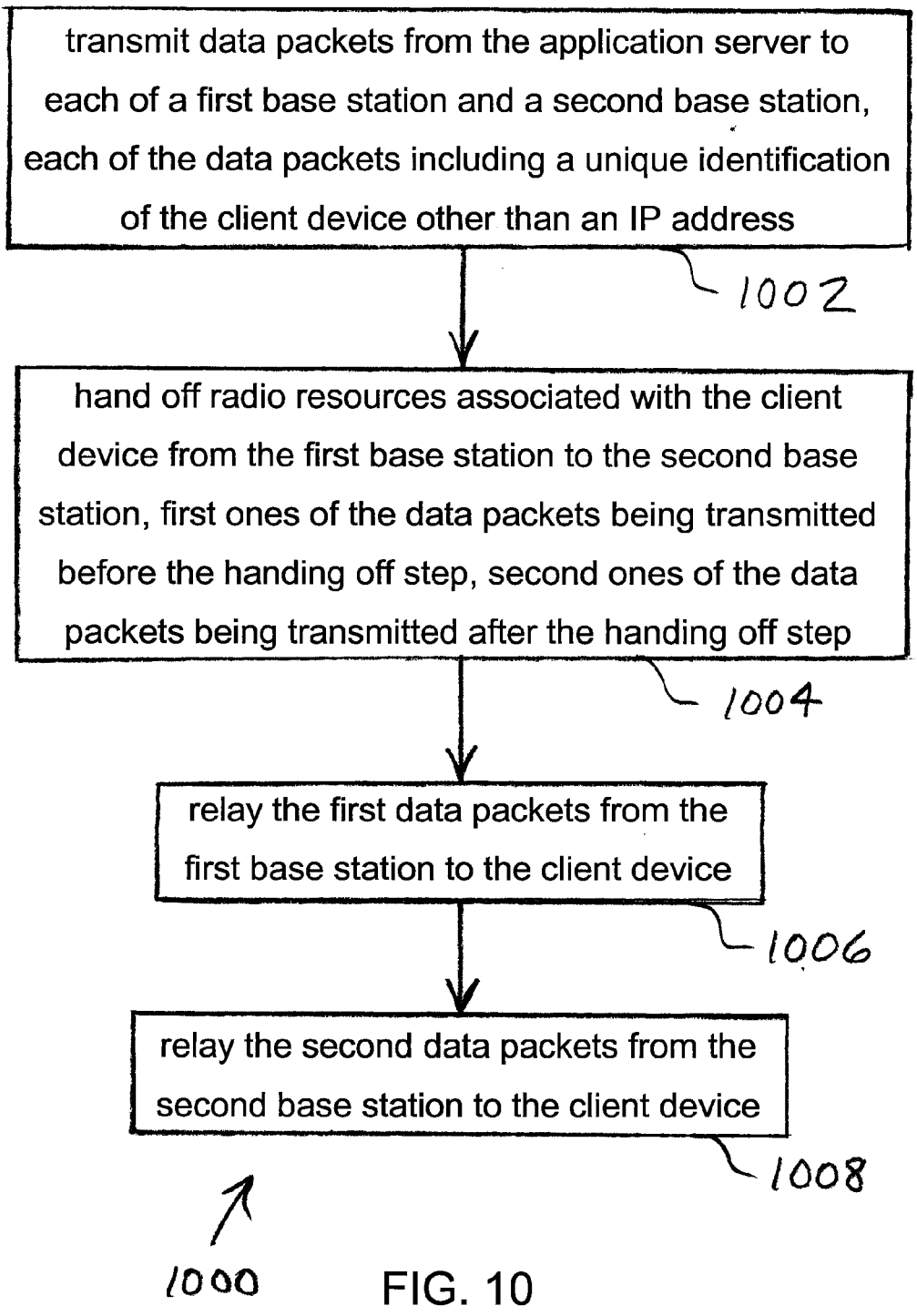
FIG. 10 is a flow chart illustrating one embodiment of a method of the present invention for wirelessly communicating between an application server and a client device.

Yet another embodiment of a method 1000 of the present invention for wirelessly communicating between an application server and a client device is illustrated in FIG. 10. In a first step 1002, data packets are transmitted from the application server to each of a first base station and a second base station, each of the data packets including a unique identification of the client device other than an IP address. For example, an application server 18 (FIG. 7), operating via the internet 20, may transmit data packets 24-A to a first base station BS-A and may transmit data packets 24-B to a second base station BS-B. Each of data packets 24-A and 24-B may include a unique identification of client vehicle 26 in the form of a MAC address ($MAC_1$) disposed between an IP address of the base station and the data in the data packet. The unique identification of the client device may be in the form of a cell phone number or any other alphanumeric string (except for the device's IP address) dedicated to the client device.

For comparison, the data packet format of the prior art is also shown in FIGS. 7 at 28-A and 28-B. This prior art data packet format may include only the IP address of the client device 26 followed by the data.

In a second step 1004, radio resources associated with the client device are handed off from the first base station to the second base station, first ones of the data packets being transmitted before the handing off step, second ones of the data packets being transmitted after the handing off step. That is, the handing off of radio resources may include establishing communication between the client device and the new, second base station. The term "handoff" as generally used in wireless communication may refer to the process including scanning, authentication, and association, each of which may be performed by firmware. That is, a new base station that can provide improved quality of service may be scanned for and thus identified.

The identified new base station may be authenticated as being a legitimate and secure base station that is intended to be a part of the network. The association component of the handoff process may include handshakes between the client and the new base station, or any other process that enables the client and the new base station to communicate more efficiently with an agreed upon format and a reduced level of overhead. A driver may be provided to initialize the firmware, and set some configurations. First ones of the data packets (i.e., data packets 24-A) to base station BS-A may be transmitted by application server 18 before the handoff. In contrast, second ones of the data packets (i.e., data packets 24-B) to base station BS-B may be transmitted by application server 18 after the handoff when base station BS-B may provide the better quality of service.

The handoff process may be described above as a hard handoff characterized by the first base station being dropped by the client immediately upon the client beginning communication with the second base station. However, it is within the scope of the invention for the handoff process to be of the soft type in which both the first ones of the data packets (i.e., data packets 24-A) and the second ones of the data packets (i.e., data packets 24-B) are transmitted simultaneously during the handoff process. That is, client 26 may remain in communication with first base station BS-A for a short period of time after client 26 begins communication with second base station BS-B until the communication with second base station BS-B is more firmly established.

In a third step 1006, the first data packets are relayed from the first base station to the client device. That is, first base station BS-A may transmit first data packets 24-A from application server 18 to client device 26.

In a fourth step 1008, the second data packets are relayed from the second base station to the client device. That is, second base station BS-B may transmit second data packets 24-B from application server 18 to client device 26.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of handing off radio resources from a first base station to a second base station, the method comprising the steps of:
    transmitting route information and speed information associated with a client device from the client device to the first base station;
    selecting a time at which the radio resources are to be handed off from the first base station to the second base station, the selecting being performed by the first base station, the selecting being performed dependent upon the route information and speed information;
    using the first base station to continuously monitor an outgoing quality of service for an application running on the client device; and
    using the first base station to respond to the quality of service falling below a threshold level by scanning for other base stations that are nearer to the client device.

2. The method of claim 1 comprising the further step of using the first base station to respond to the quality of service falling below a threshold level by requesting the route information and speed information from the client device.

3. The method of claim 1 wherein the selected time is a time at which the client device is expected to begin to have a better quality of service with the second base station than with the first base station.

4. The method of claim 1 comprising the further step, after the radio resources have been handed off from the first base station to the second base station, of using the second base station to instruct an application server to begin transmitting application data packets to only the second base station.

5. The method of claim 1 wherein the first base station performs authentication and reservation of the radio resources on behalf of the client device.

6. A method of handing off radio resources between base stations, the method comprising the steps of:
    transmitting route information and speed information associated with a client device from the client device to an application server, the route information including a planned route from a navigation system;
    choosing a second of the base stations to which the radio resources are to be handed off from a first of the base stations; and
    selecting a time at which the radio resources are to be handed off from the first base station to the second base station, the choosing and selecting being performed by the application server, the choosing and selecting being performed dependent upon the route information and speed information.

7. The method of claim 6 comprising the further step of transmitting support information identifying wireless technologies supported by the client device, the support information being transmitted from the client device to the application server, the choosing step being dependent upon the support information.

8. The method of claim 6 comprising the further step of maintaining a list of the base stations and locations of the base stations, the list being maintained at the application server.

9. The method of claim 6 comprising the further step, before the radio resources are handed off from the first base station to the second base station, of providing the client device with radio resource information associated with the second base station.

10. The method of claim 9 wherein the radio resource information comprises at least one of a frequency slot, a code slot, a power level, a beacon, and a base station identification.

11. The method of claim 6 comprising the further step, before the radio resources are handed off from the first base station to the second base station, of using the second base station to reserve network resources for the client device.

12. A method of wireles sly communicating between an application server and a client device, the method comprising the steps of:
    transmitting same data packets from the application server to each of a first base station and a second base station using their respective identifications;
    each of the data packets further including a unique identification of the client device other than an IP address;
    handing off radio resources associated with the client device from the first base station to the second base station, during the handoff data packets being transmitted simultaneously to both the base stations;
    relaying the data packets from the first base station to the client device; and
    relaying the data packets from the second base station to the client device.

13. The method of claim 12 comprising the further step of responding to the handing off step by informing the application server that the client device is within a network of the second base station.

14. The method of claim 13 wherein each of the data packets includes an IP address of whichever of the first base station and the second base station that the data packet is being transmitted to.

15. The method of claim 13 wherein the second base station performs the informing step, the method comprising the further step of responding to the informing step by transmitting data packets from the application server to only the second base station.

16. The method of claim 12 wherein the unique identification of the client device comprises a MAC address.

17. The method of claim 12 wherein the unique identification of the client device comprises a tuple including identification of wireless technologies supported by the client device.

18. The method of claim 12 wherein first ones of the data packets are relayed from the first base station to the client device, and second ones of the data packets are relayed from the second base station to the client device.

19. The method of claim 18 wherein the first ones of the data packets are different from the second ones of the data packets.

20. The method of claim 12 comprising the further step of using the client device to determine a location of the client device at which the handoff is to be initiated.

21. The method of claim 20 wherein the client device uses route information associated with the client device to make the determination, the route information including a planned route from a navigation system.

22. A method of handing off radio resources between base stations, the method comprising the steps of:
    maintaining a list of supported base stations on a client device;
    determining whether a quality of service at the client device exceeds a threshold level of quality; and
    if the quality of service at the client device is below the threshold level of quality, then:
        using the client device to choose a second of the base stations on the list to which the radio resources are to be handed off from a first of the base stations on the list; and
        using the client device to determine a location of the client device at which the handoff is to be initiated, the client device using route information associated with the client device to make the determination, the route information including a planned route from a navigation system.

23. The method of claim 22 comprising the further step of using the client device to initiate a handoff of the radio resources from the first of the base stations on the list to the second of the base stations on the list.

24. The method of claim 23 wherein the initiation of the handoff is dependent upon the quality of service at the client device.

25. The method of claim 23 wherein, if the client device determines that a second said base station associated with a better quality of service than the first base station is not available, then the client device inhibits initiation of a handoff of the radio resources from the first of the base stations on the list to the second of the base stations on the list.

26. The method of claim 22 comprising the further step of the client device using a learning algorithm to learn over time which of the supported base stations on the list to connect to and when to connect to the supported base stations.

27. The method of claim 22 wherein the client device is communicatively connected to a plurality of base stations simultaneously.

* * * * *